United States Patent [19]

Righele et al.

[11] Patent Number: 4,975,033
[45] Date of Patent: Dec. 4, 1990

[54] ROTARY PUMP FOR SACKING GROUND MEAT WITH MEANS FOR DRIVING THE FEEDER UNIT OF THE HOPPER CONNECTED DIRECTLY TO THE DRIVING SHAFT OF THE PUMP ITSELF

[76] Inventors: Giovanni B. Righele, Via Tiziano, 436010 Zane' (Vicenza); Giuseppe Scorzato, Via Prole, 36035 Marano Vicentino (Vicenza), both of Italy

[21] Appl. No.: 247,243

[22] Filed: Sep. 21, 1988

[30] Foreign Application Priority Data

Oct. 16, 1987 [IT]  Italy .............................. 22558/87[U]

[51] Int. Cl.$^5$ ......................... F04C 2/00; A22C 11/08
[52] U.S. Cl. ......................... 418/231; 17/37
[58] Field of Search .................. 99/494, 501, 503; 17/35–42; 418/321

[56] References Cited

U.S. PATENT DOCUMENTS 4,370,779  2/1983  Meier ..................................... 17/40
4,451,954  6/1984  Muller .................................... 17/39

FOREIGN PATENT DOCUMENTS 1432513  3/1968  Fed. Rep. of Germany .......... 17/35

Primary Examiner—Leonard E. Smith
Assistant Examiner—John A. Savio, III
Attorney, Agent, or Firm—Eckert Seamans Cherin & Mellott

[57] ABSTRACT

The pump has a pumping chamber defined by a stator and by a rotor with a driving shaft. A hopper with a feeder unit is positioned above the pumping chamber and is connected with it. The feeder unit receives its motion from the upper end of the driving shaft through means for the transmission of motion positioned above the pump.

4 Claims, 2 Drawing Sheets

ROTARY PUMP FOR SACKING GROUND MEAT WITH MEANS FOR DRIVING THE FEEDER UNIT OF THE HOPPER CONNECTED DIRECTLY TO THE DRIVING SHAFT OF THE PUMP ITSELF

DESCRIPTION

The present invention relates to a rotary pump for sacking ground meat with means for driving the feeder unit of the hopper connected directly to the driving shaft of the pump itself.

A known type of rotary pump for sacking, described for example in the Italian utility model application No. 24177 B/85, comprises a stator and a rotor rotatably housed in it so as to define an annular pumping chamber which is connected with a hopper by means of a feeder mouth and with a sacking casing by a meat delivery opening.

Said rotor comprises a driving shaft and an annular portion, integral with said driving shaft, having radial passages for a plurality of pump elements which can slide vertically in them due to the engagement of their upper and lower extremities with respective fixed cams provided in the cover and in the bottom of said pump chamber. In the pump there are is provided a suction system to remove air from the meat to be sacked.

In one such pump, when very hard products are fed, the suction vacuum is not sufficient to feed the pump with sufficient continuity, so as to prevent the formation and the propagation of air pockets in the sacked product. A screw operated feeder unit has therefore been provided within the hopper which produces a continuous and uniform feeding action of the product within the pump chamber.

Such feeder unit is connected to a ring gear which surrounds the lower part of the hopper and which receives its motion from a toothed pinion provided at the upper end of a driven shaft whose lower toothed end is connected to a gear wheel integral with the pump driving shaft. The driven shaft is also connected to a rev counter included in an electrical circuit for the angular control of the pump and the consequent regulation of the amount of product to be sacked.

Such pump has the drawback that the system for transmitting motion to the ring gear connected to the feeder unit of the hopper is very complex and thus implies a higher cost of the pump and an operating efficiency which is not at an optimum level.

In view of this state of the art, the object of the present invention is to accomplish a rotary pump for sacking ground meat in which the driving system for the feeder unit of the hopper has a much simpler structure and is also more effective than the known types.

According to the invention, such object is attained by providing a rotary pump for sacking ground meat, comprising a pumping chamber defined by a stator and a rotor rotatably housed in said stator, said chamber being connected with a hopper, provided with a feeder unit, by means of a feeder mouth and with a sacking casing by means of a delivery mouth for the meat, said rotor comprising a driving shaft and mobile means for alternately pumping the product towards the delivery mouth, characterized in that said feeder unit of the hopper receives its motion from the upper end of said driving shaft by transmission means positioned on the upper part of the pump.

With such an arrangement the presence of the driven shaft is eliminated, attaining the advantage of reducing the number of parts involved in the system for the transmission of the motion to the feeder unit and the overall size of the pump.

One possible embodiment of the present invention is illustrated, as a non-limiting example, in the enclosed drawings, in which.

Figure 1:
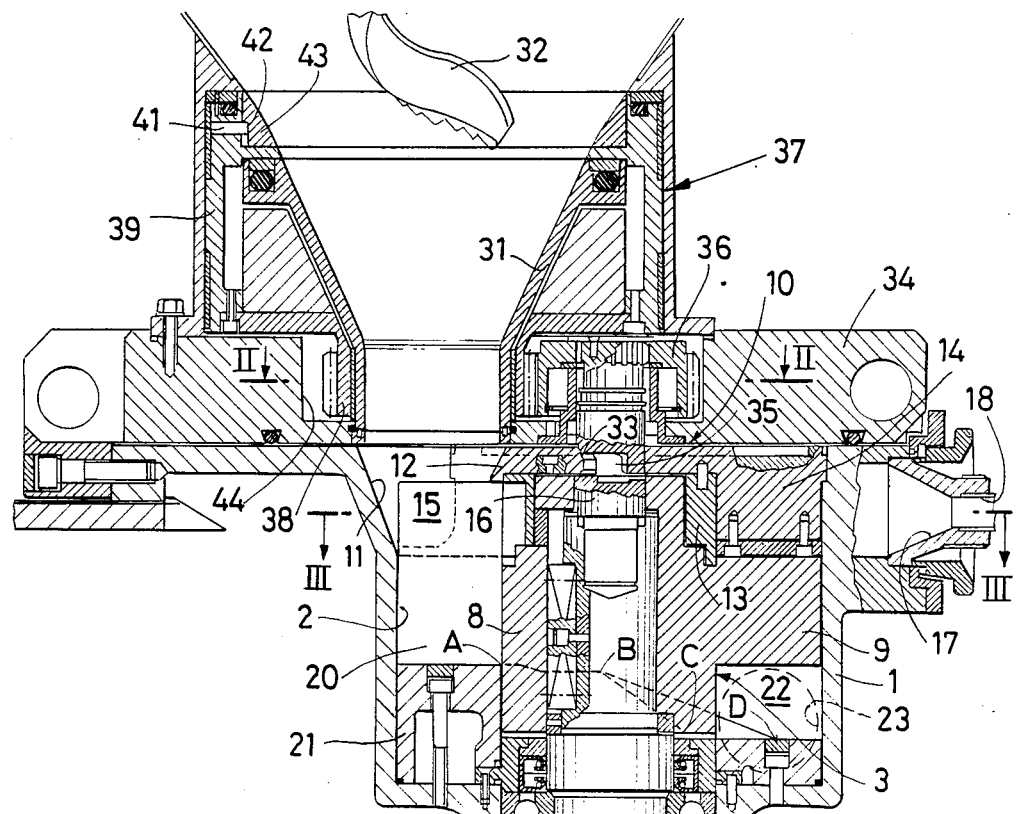
FIG. 1 is an axial cross-sectional view of a sacking pump according to the invention along the line I—I of FIG. 3.
Figure 1:
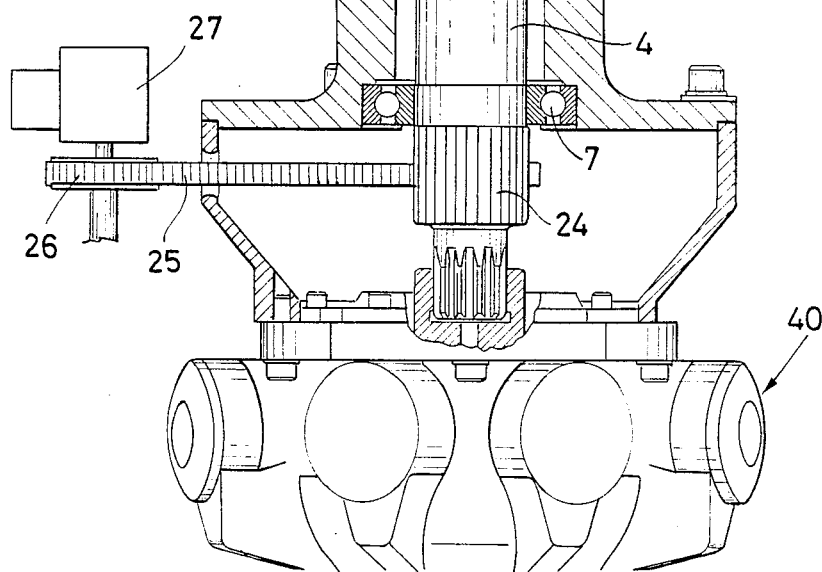

With reference to the drawings there are shown a rotary type sacking pump comprising a stator 1 defining a cylindrical cavity 2 with vertical axis and a rotor 3 rotatably housed in said cylindrical cavity of the stator. The rotor 3 is rotated, in the direction of the arrow F of FIG. 3, by a driving shaft 4 connected to the motor 40 and supported by the stator 1 by means of three bearings 5, 6 and 7.

The rotor comprises a central cylindrical part 8 and a peripheral annular part 9 with a lower height. The cylindrical cavity 2 is closed at its upper end by a cover 10 which includes a first hole 12, an annular collar 13 arranged with some clearance around the central part 8 of the rotor 3, a radial baffle 14 with its lower end just in contact with the upper end of the peripheral part 9 of the rotor 3, a second hole 33 for the passage of the upper end 16 of the driving shaft 4 and a fixed annular cam 30 (FIG. 3), whose objects will be explained later. On the cover 10, opposite the first hole 12, there is provided a loading hopper 31 with a screw-operated feeder unit 32.

The cover 10 is clamped by means of a closing plate 34 with a passage 44 housing both the lower part of the hopper and the parts connected to the upper end 16 of the driving shaft. On said end 16 there is a dog clutch 35 on which there is inserted a pinion 36 which is coupled to an annular element 37 which transmits the motion to said screw-operated feeder unit 32.

Figure 2:
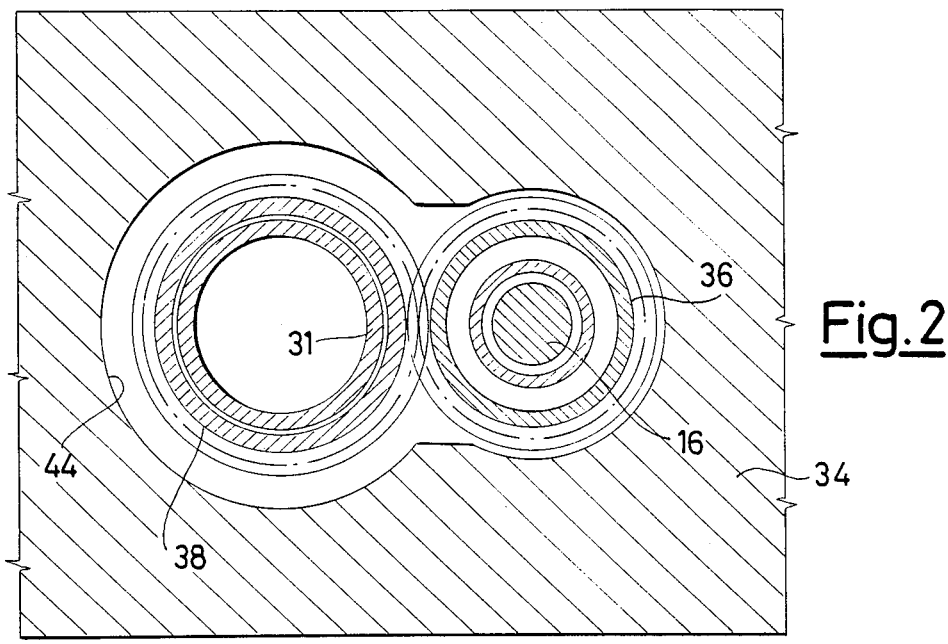
FIG. 2 is a transverse cross-sectional view of said sacking pump taken along the line II—II of FIG. 1.

Said annular element 37 comprises a first portion 38 in the shape of a ring gear, which is coupled at the lower end with the pinion 36 (FIG. 2) and fastened at the upper end to a second portion 39 of said element 37. Said second portion 39 has protruding pins 41 which engage in openings 42 obtained in a ring gear 43 integral with the feeder unit 32.

Figure 3:
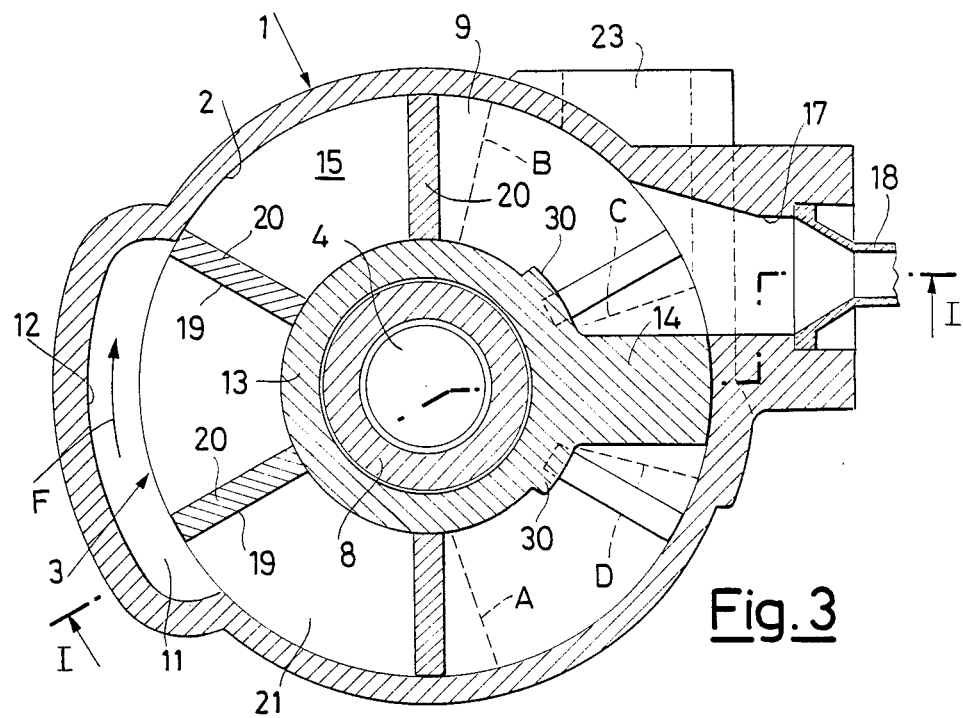
FIG. 3 is a transverse cross-sectional view of said sacking pump taken along the line III—III of FIG. 1.

As can be seen from FIGS. 1 and 3, between the stator 1, the rotor 3 and the cover 10 there remains defined an upper annular chamber 15, which has a filler mouth 11 coinciding with the hole 12 of the cover 10 and a delivery mouth 17 with a funnel-type mouth 18, on which the casing is fitted to be filled with the ground meat delivered by the pump. The radial baffle 14 is placed immediately downstream from the delivery mouth 17 to act as a dividing wall of the annular cavity 15.

In the peripheral part 9 of the rotor 3 there are six equally spaced radial passages 19 (FIG. 3), in which as many pumping elements 20 are slidably housed, which are made alternatively to protrude from and return to the space of the above peripheral part 9 according to a pre-determined sequence defined by the already described upper annular cam 30, against which rub the upper ends of the elements 20, and by a complementary fixed lower cam 21, which is housed in an annular opening 22 defined between the peripheral part 9 of the rotor 3 and the bottom of the cylindrical cavity 2 of the stator 1 and supports in brushing contact the lower ends of the elements 20.

As shown in FIGS. 1 and 3, the lower annular cam 21 comprises a raised flat section A-B which extends from a point A upstream from the filler mouth 11 to a point B upstream from the delivery mouth 17, a descending section B-C which extends from the already mentioned point B to a point C which substantially coincides with the delivery mouth 17, a lowered flat section C-D which extends from the already mentioned point C to a point D downstream from the dividing baffle 14, and lastly an ascending section D-A. As a consequence, the pumping elements 20 protrude to their greatest extent from the peripheral part 9 of the rotor 3 in the section A-B, which includes the filler mouth 11 and almost reaches the delivery mouth 17, there to descend progressively in the section B-C to disappear completely and pass under the dividing baffle 14 in the section C-B, that is, in the area coinciding with the delivery mouth 17, when they are required not to hamper the pumping action of the subsequent element 20.

As is also shown in FIGS. 1 and 3, in the lower opening 22, in a position which is diametrically opposite to that below the filler mouth 11, there opens a suction mouth 23 appropriately connected to a suction device (not shown).

On the lower part of the driving shaft 4, above the area where it engages the motor 40, there is a pinion 24 on which there is inserted a toothed belt 25 connecting with a gear wheel 26 driving a rev counter 27 inserted in an appropriate electronic circuit to control the angular position of the rotor and obtain the regulation of the amount of product to be sacked.

The pump described operates as follows. As a consequence of the up and down motion imparted to the elements 20 by the complementary cams 21 and 30, the part of the upper annular chamber 15 which is included between the points A and B is divided into a plurality of compartments, in each of which a specific quantity of ground meat is fed by the filler mouth 11.

As a result of the rotation of the rotor 3, said specific quantities of meat are conveyed by the pumping elements 20 coming towards the delivery mouth 17, executing during the last part of their path along the annular chamber 15 a displacement which is almost rectilinear and free of obstacles, which prevents mincing, chopping or grinding of the meat.

At the same time the driving shaft 4, by means of the pinion 36, drives the annular element 37 which in turn transmits the motion to the ring gear 43 and thus to the feeder unit 32, which pushes the product in a continuous and homogeneous way towards the mouth 11. The speed of rotation of the feeder unit 32 is appropriately regulated by the adequate dimension of the pinion 36 and of the ring gear 38 of the annular element 37.

The suction mouth 23 ensures the de-aeration of the pumped product, as well as, as already said, the elimination of the air present in the lower opening 22.

We claim:

1. Rotary pump for sacking ground meat, comprising a pumping chamber defined by a stator and a rotor rotatably housed in said stator, said chamber being connected with a hopper provided with a feeder unit by means of a feeder mouth and with a sacking casing by means of a delivery mouth for the meat, said rotor comprising a driving shaft and mobile means for alternately pumping a product toward the delivery mouth, wherein said feeder unit of the hopper receives its motion from an upper end of said driving shaft by transmission means placed on an upper part of the same said driving shaft as the pump.

2. The rotary pump according to claim 1, wherein said transmission means comprises a pinion fastened to the upper end of said driving shaft.

3. The rotary pump according to claim 1, wherein said transmission means comprises a ring gear engaged with said pinion and fastened to an annular element rotatably housed in a housing of the hopper and fastened to said feeder unit.

4. The rotary pump according to claim 1, further comprising a pinion on a lower part of the driving shaft, a toothed belt inserted on and driven by the pinion, a gear wheel driven by the toothed belt, and a rev counter driven by the gear wheel, wherein the rev counter is included in an electronic control circuit for determining angular position of the rotor.

* * * * *